United States Patent
Schwartz et al.

(10) Patent No.: US 6,720,046 B2
(45) Date of Patent: Apr. 13, 2004

(54) LOW SCALPING LAMINATE FOR PACKAGING MATERIAL

(75) Inventors: Stuart Schwartz, Chicago, IL (US); Tsuyoshi Baba, Suntogun Shizuoka Perfecture (JP); Nils Toft, Malmo (SE)

(73) Assignee: Tetra Laval Holdings & Finance, S.A., Pully (CH)

( * ) Notice: Subject to any disclaimer, the term of this patent is extended or adjusted under 35 U.S.C. 154(b) by 124 days.

(21) Appl. No.: 09/881,471

(22) Filed: Jun. 14, 2001

(65) Prior Publication Data

US 2002/0192405 A1 Dec. 19, 2002

(51) Int. Cl.[7] .............................. B65D 1/22; B65D 5/40; B32B 27/10; B32B 27/08; B32B 27/34
(52) U.S. Cl. ..................... 428/35.7; 428/34.2; 428/339; 428/476.3; 428/476.1; 428/474.7
(58) Field of Search ............................. 428/35.7, 34.2, 428/339, 476.3, 476.1, 474.7

(56) References Cited

U.S. PATENT DOCUMENTS

| | | | |
|---|---|---|---|
| 4,753,832 A | 6/1988 | Brown et al. .................. 428/35 |
| 4,795,665 A | 1/1989 | Lancaster et al. ........... 428/34.2 |
| 4,802,943 A | 2/1989 | Gibbons et al. ........ 156/224.23 |
| 4,950,510 A | 8/1990 | Massouda .................. 428/34.2 |
| 4,981,739 A | 1/1991 | Gibbons et al. ............ 428/34.2 |
| 4,988,546 A | 1/1991 | Tanner et al. .............. 428/34.2 |
| 5,059,459 A | 10/1991 | Huffman .................... 428/34.2 |
| 5,114,626 A | 5/1992 | Huffman ....................... 264/80 |
| 5,116,649 A | 5/1992 | Massouda .................. 428/34.2 |
| 5,296,070 A | 3/1994 | Take et al. ............. 156/244.11 |
| 5,306,533 A | 4/1994 | Robichaud et al. ......... 428/34.2 |
| 5,433,982 A | 7/1995 | Yamada et al. ............. 428/35.7 |
| 5,695,839 A | 12/1997 | Yamada et al. ............. 428/35.7 |
| 6,010,759 A | 1/2000 | Yamada et al. ............. 428/35.7 |
| 6,193,827 B1 | 2/2001 | Parks et al. ................... 156/82 |
| 6,436,547 B1 * | 8/2002 | Toft et al. ................. 428/474.4 |

FOREIGN PATENT DOCUMENTS

WO  WO 99/50066  3/1999

OTHER PUBLICATIONS

Undated Material by Mitsubishi Gas chemical Company, Inc. entitled: "Nylon–MXD6—Superior Performance in Barrier Packaging".

* cited by examiner

Primary Examiner—Harold Pyon
Assistant Examiner—Chris Bruenjes
(74) Attorney, Agent, or Firm—Welsh & Katz, Ltd.

(57) ABSTRACT

A low scalping laminate material for a container for food packaging includes a core layer of paper or paperboard, a polymeric coating applied to one side of the core layer and a combination of layers disposed on an opposing side of the core layer. The combination of layers includes a first barrier layer disposed adjacent the core layer, a first tie layer adjacent the first barrier layer, a second barrier layer adjacent the first tie layer, a second tie layer adjacent the second barrier layer and a second polymeric coating adjacent the second tie layer. The second polymeric coating is configured for a food contacting surface. The first and second barrier layers are formed from an admixture of an aromatic polyamide resin and polyamide 6, and the first and second tie layers are formed from one of a modified polyethylene and a polyolefin. A carton formed from the low scalping laminate is disclosed.

14 Claims, 1 Drawing Sheet

LOW SCALPING LAMINATE FOR PACKAGING MATERIAL

BACKGROUND OF THE INVENTION

The present invention relates to a low scalping laminate material for packaging. More particularly, the present invention relates to a laminate material for packaging that includes a flavor loss barrier as well as an oxygen barrier.

Packages are in wide-spread use that are formed from laminated material for the storage of liquid foods. Typically, a laminated material is formed from a relatively rigid but foldable core layer onto which one or more liquid tight coatings of plastic are applied. A common core layer is paper or paperboard. This material provides good mechanical configurational stability and is relatively low-cost and typically recyclable. Liquid type plastic coatings are typically thermoplastic materials, such as polyethylene, which have good thermosealing characteristics and enhance the overall function of the package.

Laminated materials that are formed solely of paper or paperboard and a liquid-tight thermoplastic have one drawback in that they typically are highly oxygen permeable. This is particularly problematic for foods that have shelf life, flavor and/or nutrient contents that can dramatically deteriorate in contact with oxygen. Many fruit juices show a declining vitamin C content when they are exposed to oxygen.

As such, packaging materials have been developed in which a barrier layer of a gas impermeable material is provided on that side of the core layer that is on the inner surface of the package (toward the stored product). Experience has shown that superior oxygen impermeability is provided by material such as aluminum foil, EVOH (ethylene vinyl alcohol) and PVOH (polyvinyl alcohol).

While each of these gas impermeable layers provides benefits and advantages over previously known non-barrier containing packages, they each have their drawbacks, both individually and collectively. For example, although aluminum foil provides quite acceptable oxygen barrier characteristics, materials that include aluminum foil cannot be easily recycled and can have severe environmental impact. As such, many aluminum foil based materials have been dismissed for use in single-use food packaging.

EVOH and PVOH are highly sensitive to moisture and rapidly lose their barrier characteristics against oxygen gas when they are exposed to a damp environment. Thus, these material alone are unacceptable for food packaging use when, for example, the packages may be required to have an extended shelf life. To overcome the problems associated with moisture degradation, EVOH and PVOH barrier materials can be further coated or layered with an additional polymer, such as polyethylene.

Alternatively, EVOH and PVOH can be combined with one or more known food approved polymers performing a continuous, well-integrated layer that possesses superior gas barrier properties and that possess moisture resisting characteristics. These materials, however, result in a high-cost package both with respect to the materials of construction and the methods of production. In addition, the increased number of layers results in more complex manufacturing operations.

It has also been found that packaging materials can tend to "scalp" the flavor from the packaged product. For example, it has been observed that low-density polyethylene tends to scalp or draw flavors from the packaged product into the polyethylene layer. This is particularly true with fruit juices, such as orange juice and the like, and is particularly problematic for natural juices that are packaged that are not made from fruit juice concentrates. Typically, these not-from-concentrate juices do not have flavor additives or enhancers added to the juice to supplement the natural flavor. As a result, the scalping effect of the packaging material cannot be countered by the addition of such flavor enhancers.

To this end, while the scalping or loss of flavor may not be detectable to the average consumer, it is nevertheless readily apparent from a comparison of identical product stored in a high scalping material when compared to that product stored in a low or non-scalping material container.

It is believed that the scalping effect is a result of the interaction of polar molecules present in the juice and the polar molecules of the packaging material. It has also been observed that the greater the bulk (e.g. density or thickness) of the packaging material containing polar material, the greater the interaction between the juice product and the material. Again, this is problematic in that a sufficient quantity or bulk of polymeric material must be present on the inner surface of the carton in order to assure liquid tightness of the package, and to provide sufficient material for forming seals between the various carton panels in erecting or constructing the container.

Accordingly, there exists a need for a laminate packaging material that provides high oxygen barrier characteristics to prevent oxidizing the package product. Desirably, such a laminate material further provides structural or mechanical stability, even when subjected to humid environments, such as packages that may remain "on the shelf" for prolonged periods of time. Most desirably, such a package further provides low-scalping characteristics to reduce loss of flavor from the packaged product.

BRIEF SUMMARY OF THE INVENTION

A low scalping laminate material for food packaging is formed from a core layer of paper or paperboard, a polymeric coating applied to one side (i.e., the outside) of the core layer and a novel inner combination. The inner layer includes a first barrier layer disposed adjacent the opposing side of the core layer, a first tie layer adjacent the first barrier layer, a second barrier layer adjacent the first tie layer, a second tie layer adjacent the second barrier layer, and a polymeric coating adjacent the second tie layer. The inner polymeric coating is a food contacting surface.

The first and second barrier layers are formed from an admixture of an aromatic polyamide resin and polyamide 6, and the first and second tie layers are formed from one of a modified polyethylene and a polyolefin.

Preferably, the first barrier layer is an admixture of the aromatic polyamide resin in a concentration of about 60 percent to about 100 percent and the PA-6 is present in a concentration of about 0 percent to about 40 percent. Most preferably, the aromatic polyamide resin is present in a concentration of about 75 percent and the PA-6 is present in a concentration of about 25 percent.

In a preferred laminate, the first and second tie layers are formed from a low-density polyethylene having a maleic anhydride functional group.

The first and second barrier layers preferably have a thickness of about 4 grams per square meter to about 6 grams per square meter (gsm). The first tie layer preferably has a thickness of about 13 gsm to about 17 gsm, the second tie layer preferably has a thickness of about 3 gsm to about 5 gsm and the inner polymeric coating preferably has a thickness of about 6 gsm to about 8 gsm.

The inner and outer polymeric material is a non-polar polymeric material. A preferred material is low-density polyethylene. Also acceptable are linear low density polyethylene and modified linear low density polyethylene, and blends of these materials.

A carton for food storage includes upstanding side walls, a sealed bottom wall, and a sealed top wall. The carton has an interior region for contact with the food.

The carton is formed from a low scalping laminate material. The material includes a core layer of paper or paperboard, a first polymeric coating applied to a first side of the core layer, a first barrier layer adjacent a second side of the core layer, a first tie layer adjacent the first barrier layer, a second barrier layer adjacent the first tie layer; a second tie layer adjacent the second barrier layer, and a second polymeric coating adjacent the second tie layer.

The polymeric coating is configured for contact with food. The first and second barrier layers are formed from an admixture of an aromatic polyamide resin and polyamide 6, and wherein the first and second tie layers are formed from one of a modified polyethylene and a polyolefin.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
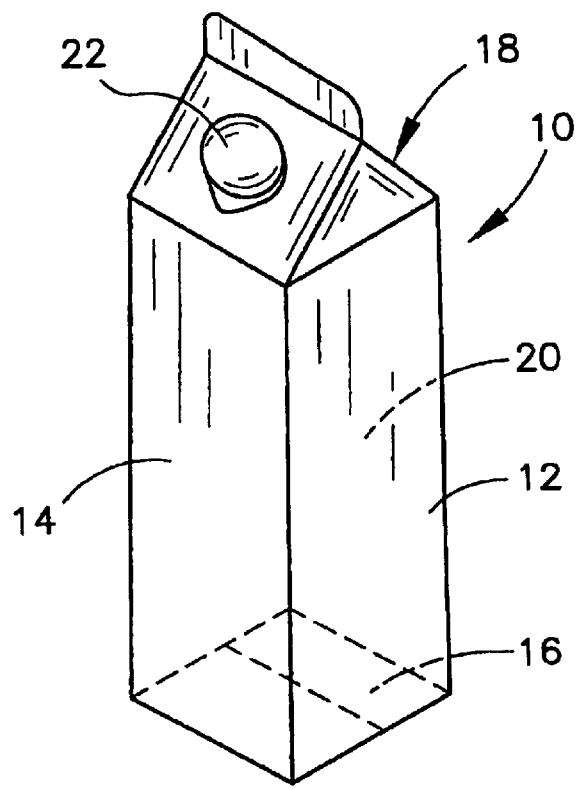
FIG. 1 is a perspective view of a typical gable top carton formed from a laminate material embodying the principles of the present invention, the carton being illustrated with a spout-type closure mounted thereto.

While the present invention is susceptible of embodiment in various forms, there is shown in the drawings and will hereinafter be described a presently preferred embodiments with the understanding that the present disclosure is to be considered an exemplification of the invention and is not intended to limit the invention to the specific embodiments illustrated. It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1, there is shown a carton 10 formed from material embodying the principles of the present invention. The illustrated carton 10 is a standard gable top carton. The carton 10 includes four upstanding side walls (two shown 12, 14), a sealed bottom wall (shown in phantom at 16) and the well recognized gable top 18. Those skilled in the art will, after a study of the present disclosure, appreciate that the present low scalping laminate material can be used for the manufacture of most any type or carton, and is not limited to use for gable top cartons. The carton 10 defines an interior region, indicated generally at 22, in which product is stored.

The carton 10 is illustrated with a closure 22, such as the exemplary spout type closure that will be recognized by those skilled in the art. These spout type closures 22 have become widely used for various products. Spout type closures 22 provide excellent resealability, while maintaining the carton 10 closed to prevent the ingress of oxygen into the carton 10.

Figure 2:
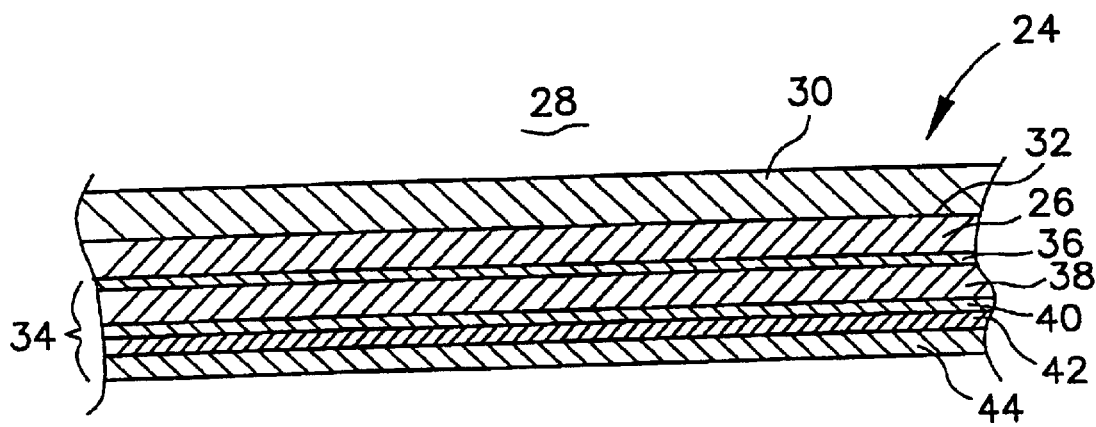
FIG. 2 is a cross-sectional illustration of an embodiment of a low scalping laminate material embodying the principles of the present invention.

The carton 10 is formed from a laminated material, such as that shown in FIG. 2, indicated generally at 24. The laminated material 24 includes a base or core layer 26 of paper or paperboard material. Paper and paperboard materials and their methods of manufacture and use will be recognized by those skilled in the art.

From the core layer 26 to the outside of the carton indicated generally at 28, the material 24 includes a layer of a moisture-resistant polymeric material 30 disposed on an outer surface 32 of the core layer 26. The material 30 is a non-polar polymeric material. Presently, one widely used material is low-density polyethylene (LDPE). LDPE is used because of its high-moisture barrier characteristics, relatively low cost and ease of use. LDPE is also approved for use in both food contacting and non-food contacting surfaces for food packaging materials Also acceptable are linear low density polyethylene (LLDPE) and modified linear low density polyethylene (m-LLDPE), and blends of these materials.

In the embodiment illustrated in FIG. 2, the inner, food contacting layer, indicated generally at 34, is a novel, five layer composite. The five layer composite 34 includes a first barrier layer 36 of an admixture of an aromatic polyamide resin produced by a polycondensation reaction between metaxylene diamine and adipic acid and polyamide 6 (PA-6).

Adjacent the first barrier layer 36, a first tie layer 38 is disposed fully covering the first barrier layer 36. The tie layer 38 is formed from a modified polyethylene/or polyolefin material. A present tie layer 38 is formed from low-density polyethylene having maleic anhydride functional groups.

Adjacent the first tie layer 38 is a second barrier layer 40. Preferably, the second barrier layer 40 is formed from identical materials in proportion (as will be discussed below) to the first barrier layer 36. A second tie layer 42 is disposed over the second barrier layer 40.

A final, inner layer 44 is disposed over the second tie layer 42. In a current embodiment, the final inner coating layer 44 is a material similar to that of the outer polymer coating layer 30. One such material is low-density polyethylene. Other materials include linear low density polyethylene and modified linear low density polyethylene, and blends of these materials. Although it is recognized that these materials in the food-contacting layer may be a "scalping" materials, in a present embodiment, the inner layer 44 is sufficiently thin (as discussed below) so that minimal scalping is observed. The tie layers 38, 42 promote adhesion between the barrier layers 36, 40 and between the barrier layer 40 and the inner layer 44. In addition, as will be discussed below, the first tie layer 38 provides "bulk" for mechanical integrity of the carton 10 seals.

In a present embodiment, the first and second barrier layers 36, 40 are formed from an admixture of the aromatic polyamide resin and PA-6. In a preferred admixture, the aromatic polyamide resin is present in a concentration of about 60 percent to about 100 percent of the admixture and the PA-6 is present in a concentration of about 0 percent to about 40 percent of the admixture. Most preferably, the aromatic polyamide resin is present in a concentration of about 75 percent of the admixture and the PA-6 is present in a concentration of about 25 percent of the admixture. In a most preferred laminate material, the first and second barrier layers 36, 40 are formed from identical materials. The barrier layer 36, 40 material has been found to exhibit exceptional low scalping characteristics.

The tie layers 38, 42 which is those layers between the first and second barrier layers 36, 40 and between the second barrier layer 40 and the inner LDPE layer 44 is, as described above formed from a modified polyethylene or polyolefin material. Most preferably, the tie layers 38, 42 are formed from a low-density polyethylene having a maleic anhydride functional group. Again, in a most preferred laminate, the first and second tie layers 38, 42 are formed from identical materials.

Each of the above-noted layers 30, 36, 38, 40, 42, 44 is provided in a specific thickness which corresponds to a weight of material per unit area of the laminate. As will be recognized by those skilled in the art, the thickness of the material is provided in units of grams per square meter (gsm) which is a commonly accepted unit of measurement in the relevant art.

The present laminate five layer structure 34 includes a first barrier layer 36 having a weight of 5 gsm (±1 gsm). The second barrier 40 layer is formed identical to the first barrier layer 36 and is applied in a substantially identical weight.

The first tie layer 38, that is the tie layer between the first and second barrier layers 36, 40 is present in a weight or 15 gsm (±1 gsm). Unlike the barrier layers 36, 40, the weights of the tie layers 38, 42 differ substantially from one another. In a present embodiment, while the first tie layer 38 is present in a weight of about 15 gsm (±1 gsm), the second tie layer 42 is present in a weight of about 4 gsm (±1 gsm). The inner layer 44 is present in a weight of 7 gsm.

As will be recognized by those skilled in the art, in traditional liquid food packaging applications, the inner low-density polyethylene barrier layer is typically present in a weight of between 30 gsm and 50 gsm. It has, however, been found that these materials, although liquid impervious, do not provide acceptable oxygen barrier characteristics. In addition, it has been found that LDPE, LLDPE, m-LLDPE and blends thereof, contribute greatly to the scalping effect of the package product flavors.

To this end, in a present laminate material 24, the inner layer 44 is kept as thin (e.g., light-weight) as is reasonably achievable, while maintaining the necessary mechanical characteristics of the package. That is, the inner layer 44 while having a weight of only between about 15 percent to 25 percent of traditional gable top packaging, is present in a sufficient weight to provide the necessary liquid impermeability characteristics and physical integrity to the overall package. The second tie layer 42, that is the tie layer immediately adjacent the inner layer 44, is also maintained at a relatively low weight. It has been found that the tie layer 42 material, like the inner layer 44 material, is a substantial contributor to the scalping effect. As such, the weight of the second tie layer 42 is maintained at about 4 gsm. This tie layer 42, nevertheless, provides sufficient adhesion between the second barrier layer 40 and the inner layer 44 such that the overall mechanical characteristics and integrity of the carton 10 are maintained.

The present laminate arrangement 24 uses a substantially heavier (e.g., thicker) first tie layer 38 (that is the tie layer between the first and second barrier layers 36, 40) to provide additional mechanical integrity to the overall package 10. In a present configuration, this first tie layer 38 has a weight of about 15 gsm, almost four times as great as the second tie layer 42. In that the first tie layer 38 is disposed between the first and second barrier layers 36, 40, its scalping effect is minimized or negated by the interposition of the second barrier layer 40. Thus, the weight of the first tie layer 38 and its substantially greater thickness has no adverse impact on the overall product quality, i.e., does not adversely increase the scalping effect.

As will be recognized by those skilled in the art, referring to the second tie layer 42 and inner layer 44, these materials, when added to one another have a combined weight of about 11 gsm. While this is still a relatively heavy (e.g., thick) portion of the overall laminate material 24, it is still considerably less than the traditionally used 30 to 50 gsm inner layer. Thus, it has been found that even with these first two layers 42, 44 contacting the food material, the extent of scalping is greatly decreased with the present laminate 24.

It has also been found that providing a substantially heavier (e.g., thicker) first tie layer 36 (at about 15 gsm) has advantages vis-à-vis the mechanical characteristics of the package 10. With respect to seal integrity, as will be recognized by those skilled in the art, during the converting and erection process, various heat seals are made between panels of the packaging material.

During heat sealing, the layers that abut one another (that is, the inner layer 44 and the outer layer 30) tend to fuse with one another to form the requisite liquid tight seals. It has been found that this substantially heavier (e.g., thicker) first tie layer 38 provides necessary "bulk" to maintain and, in fact, enhance seal integrity particularly at the side seal and at the bottom and top seals of the carton 10. It has further been found that the above-noted particular arrangement and weight (e.g., thicknesses) of the layers prevents burn-through of the material during sealing.

In a preferred package 10 and its materials of manufacture, the aromatic polyamide resin is commercially available from Mitsubishi Gas And Chemical America, Inc. of New York, N.Y., under the trade name MXD-6™. The PA-6 material is available from Ube Industries under the trade name 1022 C2. The preferred tie layer 38, 42 material, namely, the low-density polyethylene having a maleic anhydride functional group is commercially available from E. I. du Pont de Nemours and Company of Wilmington, Del. under the trade name BYNEL™, Grade 4288.

The laminate material 24 can be fabricated using any of a number of well known processes. However, it is anticipated that a coextrusion process in which the barrier layer (i.e., the aromatic polyamide resin and polyamide 6 admixture), the tie layer and the polymeric (e.g., LDPE) layer are coextruded onto the core. Other cost efficient and economical process for large scale manufacture of the materials will be recognized by those skilled in the art.

A package 10 formed in accordance with the present invention from the laminate 24 exhibits extremely good flavor retention characteristics. The package 10 has exhibited an 85 percent retention of d-limonene over an entire projected product shelf life of 10 weeks at a temperature of 4° C. D-limonene is a "carrier" of flavor, is a dominant compound present in (orange) peel oil and (orange) essence oil, and has been found to be representative of the flavor components of orange juice.

The package 10 formed from the laminate 24 has also been found to provide superior vitamin retention. In particular, the package 10 has been found to provide a $2/3$ retention of vitamin C from an initial vitamin C concentration of about 490 mg/l after 10 weeks.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A low scalping laminate material for food packaging consisting essentially of:
   a core layer of paper or paperboard;
   a polymeric coating applied to a side of the core layer;
   a first barrier layer disposed in contact with an opposing side of the core layer;
   a first tie layer disposed in contact with the first barrier layer;
   a second barrier layer disposed in contact with the first tie layer;
   a second tie layer disposed in contact with to second barrier layer; and
   a polymeric coating disposed in contact with the second tie layer, the polymeric coating configured for a food contacting surface,
   wherein the first and second barrier layers are formed from an admixture of an aromatic polyamide resin and polyamide 6, and wherein the first and second tie layers are formed from one of a modified polyethylene and a polyolefin.

2. The low scalping laminate material in accordance with claim 1 wherein the first barrier layer is an admixture of the aromatic polyamide resin in a concentration of about 60 percent to about 100 percent and the polyamide 6 is present in a concentration of about 0 percent to about 40 percent.

3. The low scalping laminate material in accordance with claim 2 wherein the aromatic polyamide resin is present in a concentration of about 75 percent and the polyamide 6 is present in a concentration of about 25 percent.

4. The low scalping laminate material in accordance with claim 1 wherein the first and second tie layers are fanned from a low-density polyethylene having a maleic anhydride functional group.

5. The low scalping laminate material in accordance with claim 1 wherein the first and second barrier layers have a thickness of about 4 grams per square meter to about 6 grams per square meter, the first tie layer has a thickness of about 13 grams per square meter to about 17 grams per square meter, the second tie layer has a thickness of about 3 grams per square meter to about 5 grams per square meter and the inner polymeric coating has a thickness of about 6 grams per square meter to about 8 grams per square meter.

6. The low scalping laminate material in accordance with claim 1 wherein the inner polymeric material is one of low-density polyethylene, linear low density polyethylene, modified linear low density polyethylene or a blend thereof.

7. The low scalping laminate material in accordance with claim 1 wherein the outer polymeric material is one of low-density polyethylene, linear low density polyethylene, modified linear low density polyethylene or a blend thereof.

8. A carton for food storage consisting essentially of:
   upstanding side walls;
   a sealed bottom wall; and
   a sealed top wall,
   the carton having an interior region for contact with the food, the carton formed from a low scalping laminate material, the low scalping material including a core layer of paper or paperboard, a first polymeric coating applied to a first side of the core layer, a first barrier layer disposed in contact wit a second side of the core layer, a first tie layer disposed in contact with the first barrier layer, a second baffler layer disposed in contact with the first tie layer; a second tie layer disposed in contact with the second baffler layer, and a second polymeric coating disposed in contact with the second tie layer, the polymeric coating configured for contact with food, wherein the first and second barrier layers are formed from an admixture of an aromatic polyamide resin and polyamide 6, and wherein the first and second tie layers are formed from one of a modified polyethylene and a polyolefin.

9. The carton in accordance with claim 8 wherein the first barrier layer is an admixture of the aromatic polyamide resin in a concentration of about 60 percent to about 100 percent and the polyamide 6 is present in a concentration of about 0 percent to about 40 percent.

10. The carton in accordance with claim 9 wherein the aromatic polyamide resin is present in a concentration of about 75 percent and the polyamide 6 is present in a concentration of about 25 percent.

11. The carton in accordance with claim 8 wherein the first and second tie layers are formed from a low-density polyethylene having a maleic anhydride functional group.

12. The carton in accordance with claim 8 wherein the first and second barrier layers have a thickness of about 4 grams per square meter to about 6 grams per square meter, the first tie layer has a thickness of about 13 grams per square meter to about 17 grams per square meter, the second tie layer has a thickness of about 3 grams per square meter to about 5 grams per square meter and the inner polymeric coating has a thickness of about 6 grams per square meter to about 8 grams per square meter.

13. The carton in accordance with claim 8 wherein the inner polymeric material one of low-density polyethylene, linear low density polyethylene, modified linear low density polyethylene or a blend thereof.

14. The carton in accordance with claim 8 wherein the outer polymeric material is a one of low-density polyethylene, linear low density polyethylene, modified linear low density polyethylene or a blend thereof.

* * * * *